United States Patent

So et al.

(10) Patent No.: US 9,544,906 B2
(45) Date of Patent: *Jan. 10, 2017

(54) CHANNEL ALLOCATION METHOD IN WIRELESS MESH NETWORK AND COMMUNICATION DEVICE USING THE METHOD

(71) Applicant: SAMSUNG ELECTRONICS CO., LTD., Suwon-si (KR)

(72) Inventors: Jung-Min So, Suwon-si (KR); Jin-Sae Jung, Seongnam-si (KR); Kyle Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 176 days.

This patent is subject to a terminal disclaimer.

(21) Appl. No.: 14/489,132

(22) Filed: Sep. 17, 2014

(65) Prior Publication Data

US 2015/0003395 A1   Jan. 1, 2015

Related U.S. Application Data

(63) Continuation of application No. 11/878,358, filed on Jul. 24, 2007, now Pat. No. 8,848,546.

(30) Foreign Application Priority Data

Jan. 22, 2007 (KR) ........................ 10-2007-0006739

(51) Int. Cl.
*H04W 72/04* (2009.01)
*H04W 24/00* (2009.01)
(Continued)

(52) U.S. Cl.
CPC .......... *H04W 72/048* (2013.01); *H04W 24/00* (2013.01); *H04W 72/04* (2013.01);
(Continued)

(58) Field of Classification Search
None
See application file for complete search history.

(56) References Cited

U.S. PATENT DOCUMENTS 6,052,656 A   4/2000   Suda et al.
6,788,963 B2  9/2004   Laroia et al.
(Continued)

FOREIGN PATENT DOCUMENTS

EP   2073131 A1    6/2009
JP   2005-065102 A  3/2005
(Continued)

OTHER PUBLICATIONS

Office Action from U.S. Appl. No. 13/844,612, dated Sep. 22, 2015, 14 pp.
(Continued)

*Primary Examiner* — Steven N Nguyen
(74) *Attorney, Agent, or Firm* — NSIP Law

(57) ABSTRACT

A channel allocation method and a communication device are provided. The channel allocation method includes determining a communication device type based on information received from neighboring communication devices, allocating a channel according to the communication device type, and transmitting the communication device type and information about the allocated channel to the neighboring communication devices.

13 Claims, 11 Drawing Sheets

(51) Int. Cl.
*H04W 84/12* (2009.01)
*H04W 76/02* (2009.01)
*H04W 84/18* (2009.01)

(52) U.S. Cl.
CPC ........ *H04W 84/12* (2013.01); *H04W 72/0406* (2013.01); *H04W 76/02* (2013.01); *H04W 84/18* (2013.01)

(56) References Cited

U.S. PATENT DOCUMENTS

| | | | |
|---|---|---|---|
| 6,977,913 | B1 | 12/2005 | Ishii et al. |
| 7,433,348 | B1 | 10/2008 | Bordui et al. |
| 7,519,034 | B2 | 4/2009 | So et al. |
| 8,848,546 | B2 * | 9/2014 | So et al. ............... 370/252 |
| 2004/0090924 | A1 | 5/2004 | Giaimo et al. |
| 2006/0067283 | A1 | 3/2006 | So et al. |
| 2006/0215611 | A1 | 9/2006 | Nakagawa et al. |
| 2006/0229069 | A1 | 10/2006 | Bindel et al. |
| 2007/0109989 | A1 | 5/2007 | Nakagawa et al. |
| 2007/0118551 | A1 | 5/2007 | Akkiraju et al. |
| 2008/0016039 | A1 | 1/2008 | Brown et al. |
| 2008/0097979 | A1 | 4/2008 | Heidloff et al. |
| 2008/0112341 | A1 * | 5/2008 | Seidel et al. ............ 370/310 |
| 2012/0102032 | A1 | 4/2012 | Bryne et al. |
| 2012/0179710 | A1 | 7/2012 | Hanai |
| 2012/0290561 | A1 | 11/2012 | Kobayashi et al. |
| 2012/0310628 | A1 | 12/2012 | Rathod et al. |

FOREIGN PATENT DOCUMENTS

| | | |
|---|---|---|
| JP | 2006-050549 A | 2/2006 |
| KR | 10-2006-0054458 A | 5/2006 |
| KR | 10-2006-0094910 A | 8/2006 |
| KR | 10-2006-0098360 A | 9/2006 |
| KR | 10-2006-0099475 A | 9/2006 |

OTHER PUBLICATIONS

Korean Office Action issued Aug. 8, 2013 in counterpart Korean Patent Application No. 10-2007-0006739. (4 Pages in Korean).

* cited by examiner

CHANNEL ALLOCATION METHOD IN WIRELESS MESH NETWORK AND COMMUNICATION DEVICE USING THE METHOD

CROSS-REFERENCE TO RELATED APPLICATIONS

This application is a Continuation of U.S. patent application Ser. No. 11/878,358 filed on Jul. 24, 2007, which claims the benefit under 35 U.S.C. §119(a) of Korean Patent Application No. 10-2007-0006739, filed on Jan. 22, 2007 in the Korean Intellectual Property Office, the entire disclosure of which is hereby incorporated by reference.

BACKGROUND OF THE INVENTION

Field of the Invention

The following description relates to a wireless mesh network. More particularly, the following description relates to a channel allocation method in a wireless mesh network and a communication device using the method. The method and device operate to enhance the efficiency of the wireless mesh network.

Description of Related Art

Generally, a wireless mesh network does not start out as such. Instead, wireless mesh network technology is technology which interoperates over various existing wireless connection technologies which are already in wide usage, and which provides users with a number of solutions to existing problems. Wireless mesh network technology shares many of the same advantages as those of other ad-hoc networks, such as self-configuring and self-healing. As a result, wireless mesh network technology can quickly build a network at a low cost. For these and other reasons, wireless mesh network technology has become very popular.

In comparison with methods such as point-to-point communications and point-to-multipoint communications used in existing wireless communications, wireless mesh network technology has several advantages, including reliable expandability of a wireless network, as well as requiring fewer outputs, since a wireless mesh network also has the network structure of a wired mesh type. Further, wireless mesh network technology is useful in various fields such as next generation mobile communications, home networking, and special purpose networking for public safety. Research has been performed at both the academic and the business level to establish exemplary test bed environments to build an enhanced mesh network.

However, communication devices should periodically overhear, negotiate, and switch a plurality of channels to transmit a data packet in the wireless mesh network since the communication devices share channels among communication devices having only a single interface.

Accordingly, there is a need for a channel allocation method in the wireless mesh network which can effectively enhance the efficiency of the network using multi channels.

SUMMARY OF THE INVENTION

The following description is provided to address at least the above problems and/or disadvantages and to provide at least the features and aspects described below. Accordingly, general aspects provide a channel allocation method and a communication device which can effectively enhance the efficiency of a network using multi-channels by classifying communication devices having a single interface as a fixed communication device or a switching communication device according to a communication device type, and by allocating a channel according to the classified communication device type.

According to one general aspect, there is provided a channel allocation method. The method includes determining a communication device type based on information received from neighboring communication devices, allocating a channel according to the communication device type, and transmitting the communication device type and information about the allocated channel to the neighboring communication devices.

According to one general aspect, a communication device is provided. The device includes a type determination unit for determining a communication device type based on information received from neighboring communication devices, a channel allocation unit for allocating a channel according to the determined communication device type, and a transmitting/receiving unit for transmitting information about the determined communication device type and the allocated channel to the neighboring communication devices.

Other aspects and features may become apparent to those skilled in the art from the following detailed description, the annexed drawings, and the claims.

BRIEF DESCRIPTION OF THE DRAWINGS

The above and other features and aspects may become will be more apparent from the following detailed description, taken in conjunction with the accompanying drawings in which.

Throughout the drawings, the same drawing reference numerals will be understood to refer to the same elements, features, and structures.

DETAILED DESCRIPTION

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
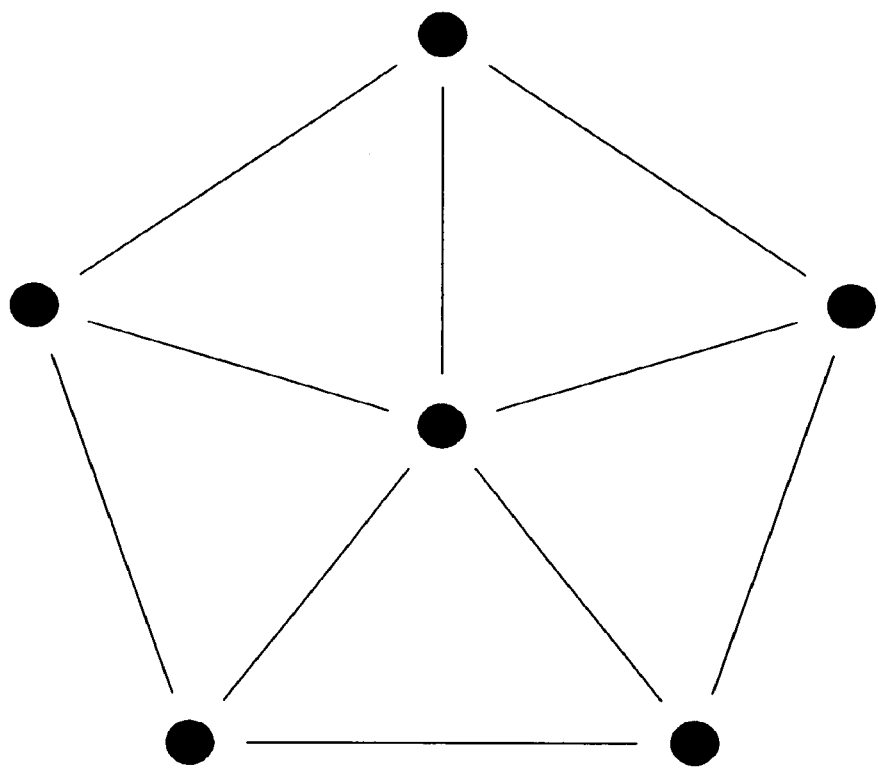
FIG. 1 is an example of a configuration diagram illustrating a wireless mesh network.

FIG. 1 is an example a configuration diagram illustrating a wireless mesh network.

As illustrated in FIG. 1, the wireless mesh network may include a plurality of communication devices covering a wide service area. Each of the plurality of communication devices is wirelessly connected to at least one neighboring communication device, and may relay a data packet in a hop-by-hop basis, similar to a router, with respect to the neighboring communication device.

One general aspect of the wireless mesh network may provide for classifying the plurality of communication devices configuring the wireless mesh network with device types, such as a fixed communication device or a switching device, according to the possibility of switching a channel. Specifically, a communication device fixed on a single channel may be classified as a fixed communication device, and a communication device capable of switching the plurality of channels may be classified as a switching communication device.

In one general aspect, the communication device may include various electronic devices such as a personal computer (PC), a notebook, a personal digital assistant (PDA), and a mobile terminal.

Hereinafter, in the annexed drawings, the fixed communication device will be illustrated as a circle with solid lines, and the switching communication device will be illustrated in a circle with dotted lines.

Figure 2:
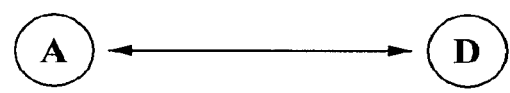
FIG. 2 is an example of a first diagram illustrating a theory of operations among communication devices.
Figure 2:
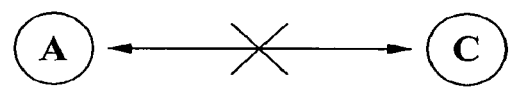
Figure 2:
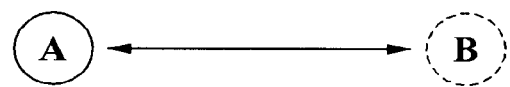
Figure 2:
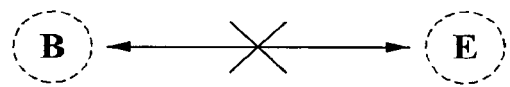

FIG. 2 is an example a first diagram illustrating a theory of operations among communication devices.

As illustrated in FIG. 2, in the communication devices according to general aspects, wireless connectivity is guaranteed according to a communication device type. In one general aspect, A and D may be used as fixed communication devices using a first channel, A and C may be used as fixed communication devices using a sixth channel, and B and E may be used as switching communication devices using the first or sixth channels.

Wireless connectivity may be guaranteed between the fixed communication devices A and D when the first channel is commonly allocated, and between the fixed communication device A and the switching device B when the first or sixth channels are commonly allocated. Conversely, wireless connectivity may not be guaranteed between the fixed communication devices A and C and between the switching communication devices B and E when different channels are allocated between the fixed communication devices A and C and between the switching communication devices B and E.

Figure 3:
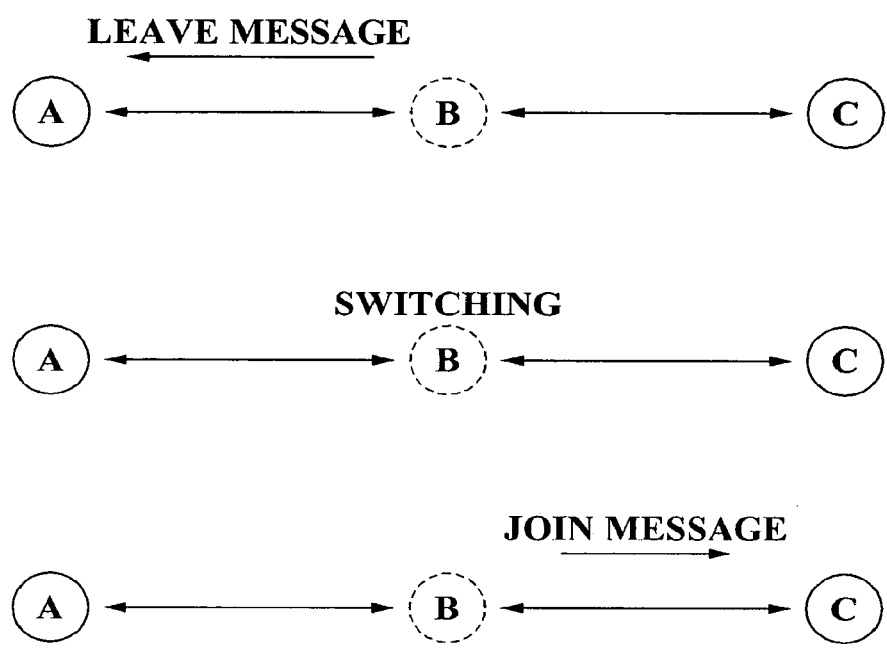
FIG. 3 is an example of a second diagram illustrating a theory of operations among communication devices.

FIG. 3 is an example of a second diagram illustrating a theory of operations among communication devices.

As illustrated in FIG. 3, switching communication devices according to one general aspect may transmit a message to neighboring communication devices when channels are switched, the message informing the neighboring communication devices that the channels are switched. Hereinafter, it is assumed that a switching communication device B, being connected to a fixed communication device A, switches from the first channel to a sixth channel.

The switching communication device B may transmit a LEAVE message to the fixed communication device A, switch from the first channel to the sixth channel, and transmit a JOIN message to the fixed communication device C.

One general aspect of the theory of operations among communication devices may provide that the LEAVE and JOIN messages may be broadcasted or unicasted.

Figure 4:
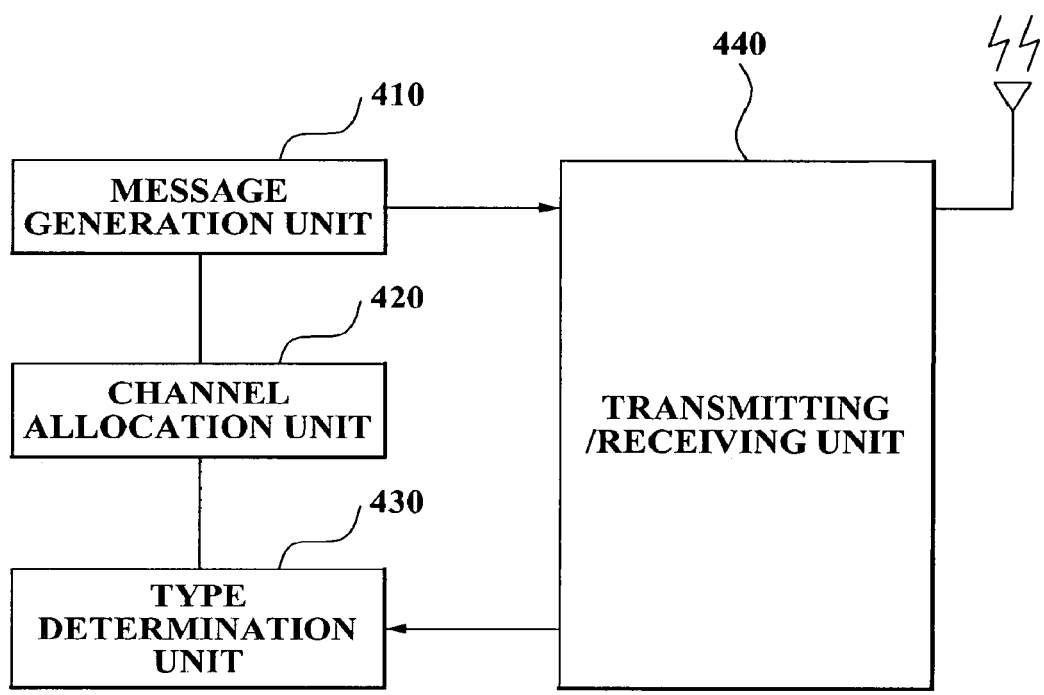
FIG. 4 is an example of a configuration diagram illustrating communication devices for allocating a channel.

FIG. 4 is an example of a configuration diagram illustrating a communication device to allocate a channel.

As illustrated in FIG. 4, the communication device according to one general aspect may include a message generation unit 410, a channel allocation unit 420, a type determination unit 430, and a transmitting/receiving unit 440.

The type determination unit 430 determines a communication device type based on information received from neighboring communication devices. The channel allocation unit 420 allocates a channel according to the determined communication device type. The transmitting/receiving unit 440 transmits information about the determined communication device type and the allocated channel to the neighboring communication devices.

The message generation unit 410 generates a HELLO message to transmit the generated HELLO message to neighboring communication devices within a range of one hop.

One general aspect of the communication device may provide that the HELLO message is a control message, and may be broadcasted to the neighboring communication devices.

Figure 5:
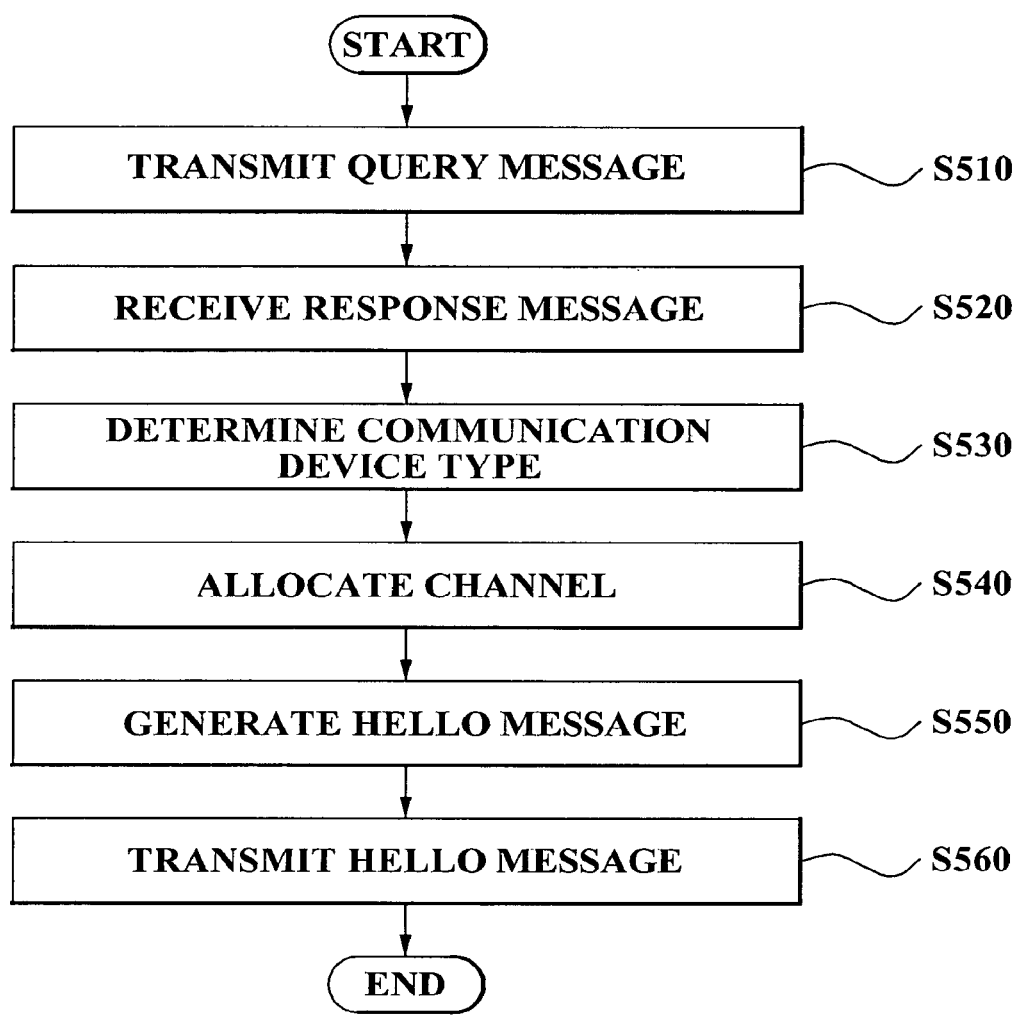
FIG. 5 is an example of a flowchart illustrating a channel allocation method.

FIG. 5 is an example of a flowchart illustrating a channel allocation method.

As illustrated in FIG. 5, the channel allocation method according to one general aspect includes operations S510, S520, S530, S540, S550, and S560, operation S510 being an operation for transmitting QUERY messages, operation S520 being an operation for receiving a response message, operation S530 being an operation for determining a communication device type, operation S540 being an operation for allocating a channel, operation S550 being an operation for generating a HELLO message, and operation S560 being an operation for transmitting the HELLO message.

Hereinafter, the channel allocation method according to one general aspect will be described in detail.

In operation S510, communication devices may transmit QUERY messages to neighboring communication devices when connecting to a wireless mesh network. The message generation unit 410 of FIG. 4 generates the QUERY message, and the transmitting/receiving unit 440 of FIG. 4 transmits the generated QUERY message to the neighboring communication devices.

In operation S520, the transmitting/receiving unit 440 receives response messages from the neighboring communication devices in response to the transmitted QUERY messages, and inputs the received response messages in the determination unit 430 of FIG. 4.

One general aspect of the channel allocation method may provide that the response message may include an ID of the neighboring communication devices, a communication device type of the neighboring communication device, an allocated channel of the neighboring communication device, an ID associated with a second neighboring communication device of the neighboring communication devices, and an allocated channel of the second neighboring communication devices.

Also, in the communication devices, each channel may transmit the QUERY message, and receive the response messages according to a Round-Robin manner to search for a channel, which is used by the second neighboring communication devices.

In operation S530, the type determination unit 430 may determine the communication device type based on the received response messages. A method for the determining of the communication device type will be described by referring to FIGS. 6 and 7.

Figure 6:
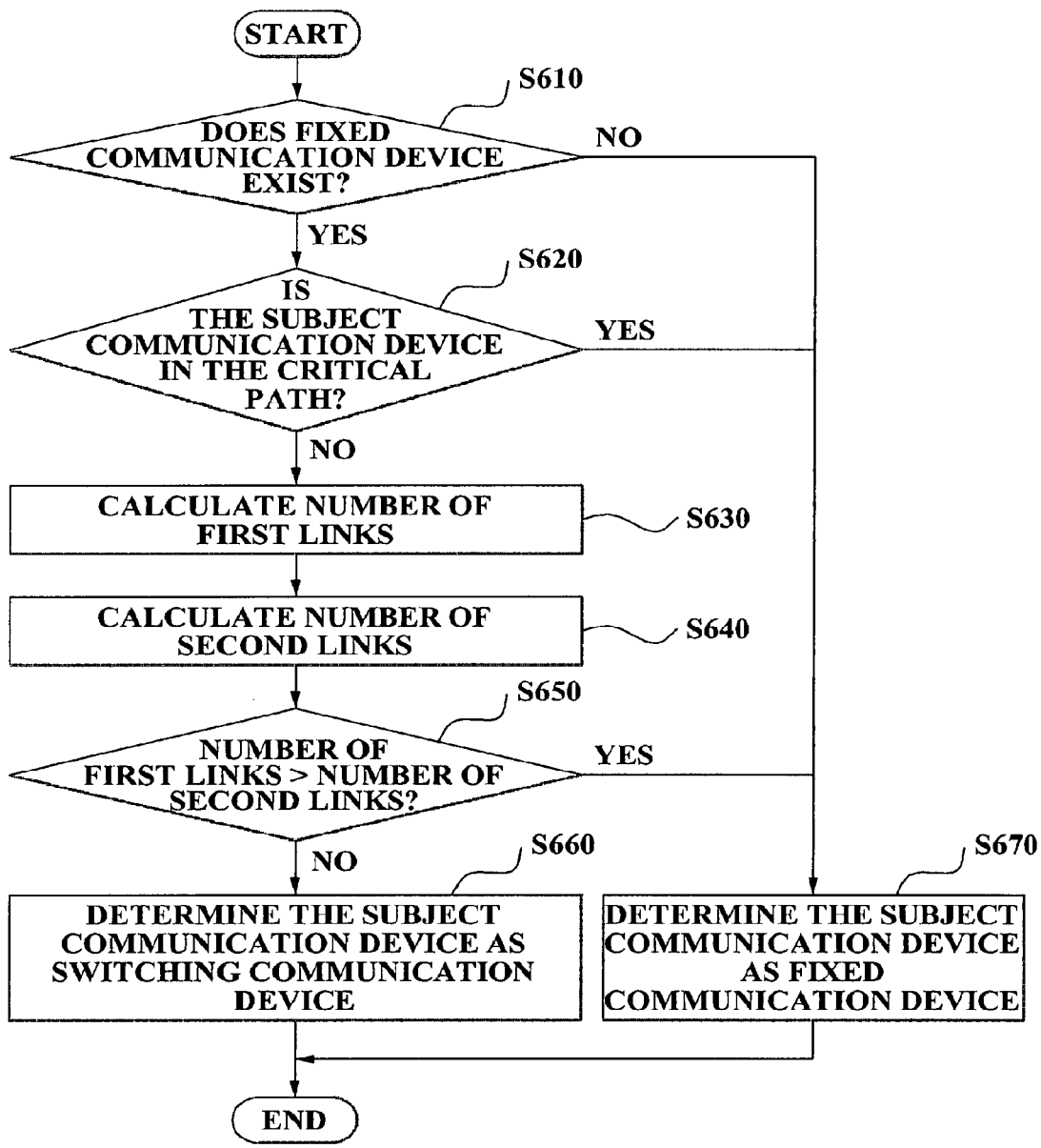
FIG. 6 is an example of a flowchart illustrating a method for determining a communication device type.

FIG. 6 is an example of a flowchart illustrating a method for determining a communication device type.

As illustrated in FIG. 6, the method for determining the communication device type according to one general aspect includes operation S610, S620, S630, S640, S650, and S660, operation S610 being an operation for checking whether a fixed communication device exists among neighboring communication devices, operation S620 being an operation for checking whether the subject communication device is in a critical path, operation S630 being an operation for calculating a number of first links, operation S640 being an operation for calculating a number of second links, operation S650 being an operation for comparing the number of first links with the number of second links, operation S660 being an operation for determining the subject communication device as a switching communication device, and operation S670 being an operation for determining the subject communication device as the fixed communication device.

Hereinafter, the method for determining the communication device type according to one general aspect will be described.

In operation S610, the type determination unit 430 of FIG. 4 may check whether a fixed communication device exists within a single hop, which will be described by referring to FIG. 7.

Figure 7:
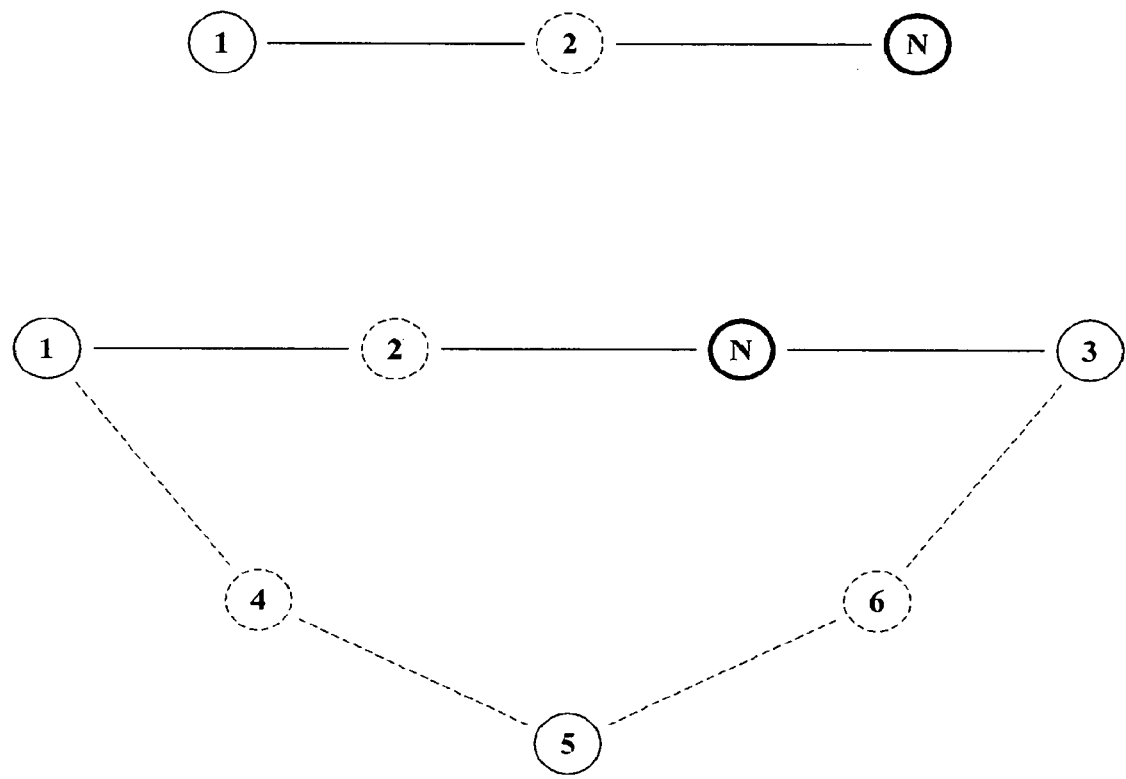
FIG. 7 is an example a diagram illustrating the determining of the communication device type.

FIG. 7 is an example of a diagram illustrating the determining of the communication device type.

As illustrated in FIG. 7, the type determination unit 430 may determine the communication device type as a fixed communication device when a fixed communication device does not exist among the neighboring communication devices. As an example, a communication device 1 may determine the communication device N as a fixed communication device when the communication device exclusively has a switching communication device 2 as a neighboring communication device.

In operation S620, the type determination unit 430 of FIG. 4 checks whether the communication device corresponds to a critical path when a fixed communication device exists among the neighboring communication devices. Namely, the type determination unit 430 may determine the communication device as a fixed communication device when a path which utilizes the communication device as an intermediate communication device is unique.

One general aspect of the determining of the communication device type may provide that a critical path may be a path corresponding to at least one path between two fixed communication devices where a number of hops of other paths between the two fixed communications devices exceeds the number of hops in the critical path by a predetermined number of hops n, from among the at least one path existing between the two fixed communication devices.

The reason why the number of hops is limited is to exclude paths which lowers the efficiency of the wireless mesh network since the other paths between the two fixed communications devices exceeds the number of hops of the critical path.

When the communication device N has the switching communication device 2 and the fixed communication device 3 as neighboring communication devices, the communication device N may check whether the communication device N corresponds to the critical path between communication device 3 and another fixed communication device since the communication device 3 of the neighboring communication devices is a fixed communication device.

One general aspect of the determining of the communication device type may provide that the critical path corresponds to at least one path between two fixed communication devices where a number of hops of all other paths between the two fixed communication devices exceeds the number of hops in the critical path by at least a single hop, from among the two of fixed communication devices 1 and 3.

One general aspect of the determining of the communication device type may provide that a path where the communication device N is an intermediate communication device may correspond to a critical path since the number of hops of the path where the communication device N corresponds to the intermediate communication device is 3, and a number of hops of a path where communication devices 4, 5, and 6 are intermediate communication devices is 4, from among the two paths between the fixed communication devices 1 and 3. The type determination unit 430 may calculate a number of links capable of establishing a link with the neighboring communication devices according to the communication device type when the communication device is not in a critical path. The type determination unit 430 may calculate a number of first links capable of establishing a link with the neighboring communication devices when a communication device is a fixed communication device in operation S630, and may calculate a number of second links capable of establishing a link with the neighboring communication devices when a communication device corresponds to a switching device in operation S640. A theory for the calculating of the number of first links and the number of second links will be described by referring to FIG. 8.

Figure 8:
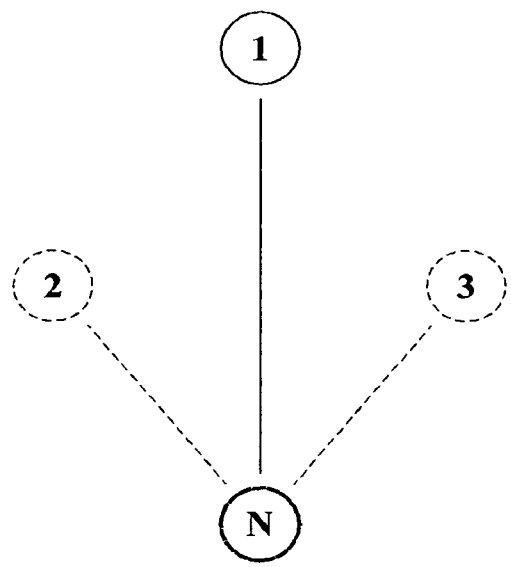
FIG. 8 is an example a diagram illustrating calculating of a number of links.
Figure 8:
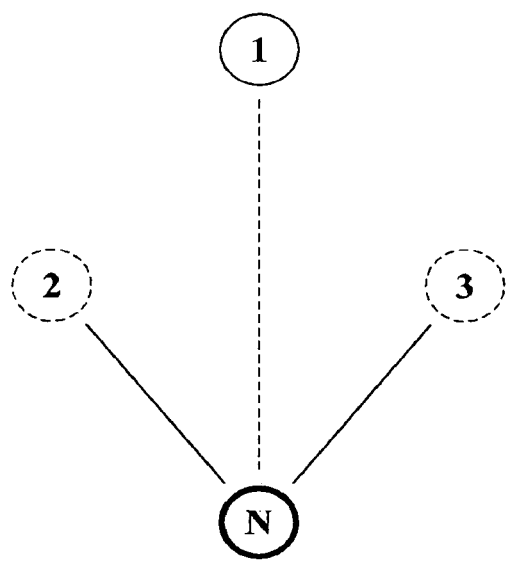

FIG. 8 is an example of a diagram illustrating a theory for calculating a number of links.

As illustrated in FIG. 8, the type determination unit 430 may calculate a number of first links and second links. When a fixed communication device 1 and switching communication devices 2 and 3 exist and when a communication device N is determined as a fixed communication device, two first links capable of establishing a link with the neighboring communication devices 2 and 3 are calculated since wireless connectivity is guaranteed between the fixed communication device N and the switching communication device 2, and between the fixed communication device N and the switching communication device 3.

When the fixed communication device 1 and the switching communication devices 2 and 3 exist and when the communication device N is determined as a switching communication device, a single second link capable of establishing a link with the neighboring communication device 1 is calculated since wireless connectivity is guaranteed between the switching device N and the fixed communication device 1.

In operation S660, the type determination unit 430 may determine the communication device as a switching communication device when the number of established first links which are established when the communication device corresponds to a fixed communication device is equal to or less than the number of established second links which are established when the communication device corresponds to a switching communication device.

In operation S670, the type determination unit 430 may determine the communication device as a fixed communication device when the number of first links which are established when the communication device corresponds to a fixed communication device is greater than the number of second links which are established when the communication device corresponds to a switching communication device.

One general aspect of the determining of the communication device type may provide that more links may be established since a number of fixed communication devices is established to be equal to a number of switching communication devices. Therefore, the efficiency of a wireless mesh network may be enhanced.

In operation S540, the channel allocation unit 420 of FIG. 4 may allocate a channel according to the determined communication device type, which will be described by referring to FIG. 9.

Figure 9:
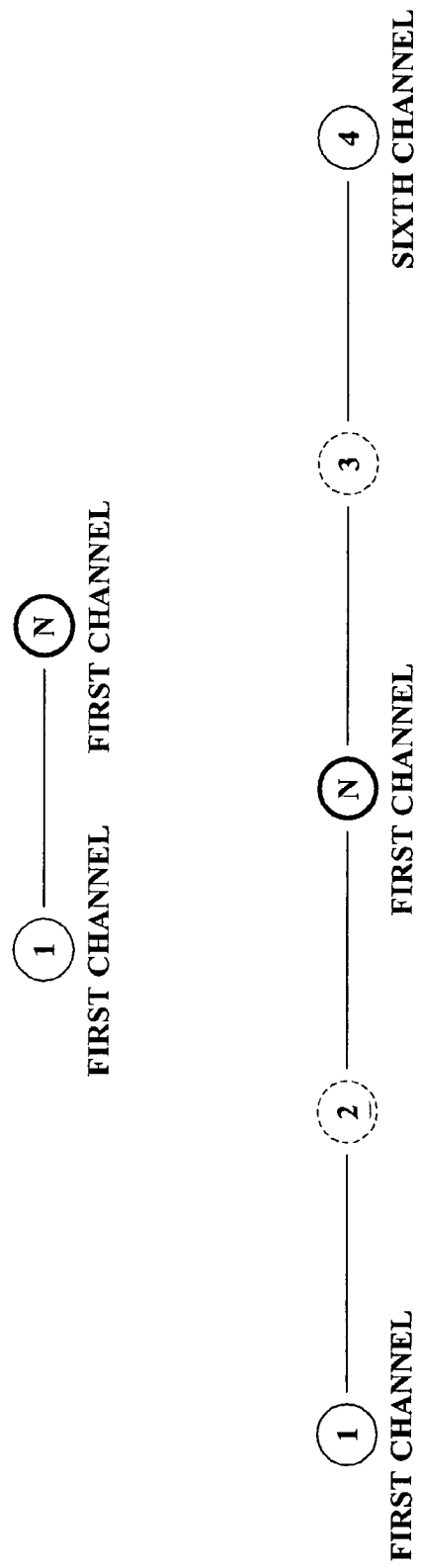
FIG. 9 is an example a diagram illustrating allocating of a channel.

FIG. 9 is an example of a diagram illustrating allocating a channel.

As illustrated in FIG. 9, the channel allocation unit 420 of FIG. 4 may allocate a first channel which is identical to a channel allocated to a fixed communication device 1 when a communication device is a fixed communication device N, when the communication device has the fixed communication device 1 as a neighboring communication device, and when the communication device does not have a neighboring communication device where a number of hops exceeds two.

Also, the channel allocation unit 420 may allocate any one of the first channel and a sixth channel, from among channels allocated to the neighboring communication device 1 and a neighboring communication device 4 when a communication device is the fixed communication device N and when the communication device has the fixed communication device 1 and the fixed communication device 4 as neighboring devices where a number of hops exceeds two.

One general aspect of the allocation of the channel may provide that the channel allocation unit 420 may allocate any one of channels which are allocated to the neighboring communication devices since the switching communication devices may switch channels among a plurality of channels.

Consequently, the message generation unit 410 of FIG. 4 may generate a HELLO message which includes the determined communication device type and allocated channels in operation S550, and transmit the generated HELLO message to the neighboring communication devices in operation S560. The generating of the HELLO message will be described by referring to FIG. 10.

Figure 10:
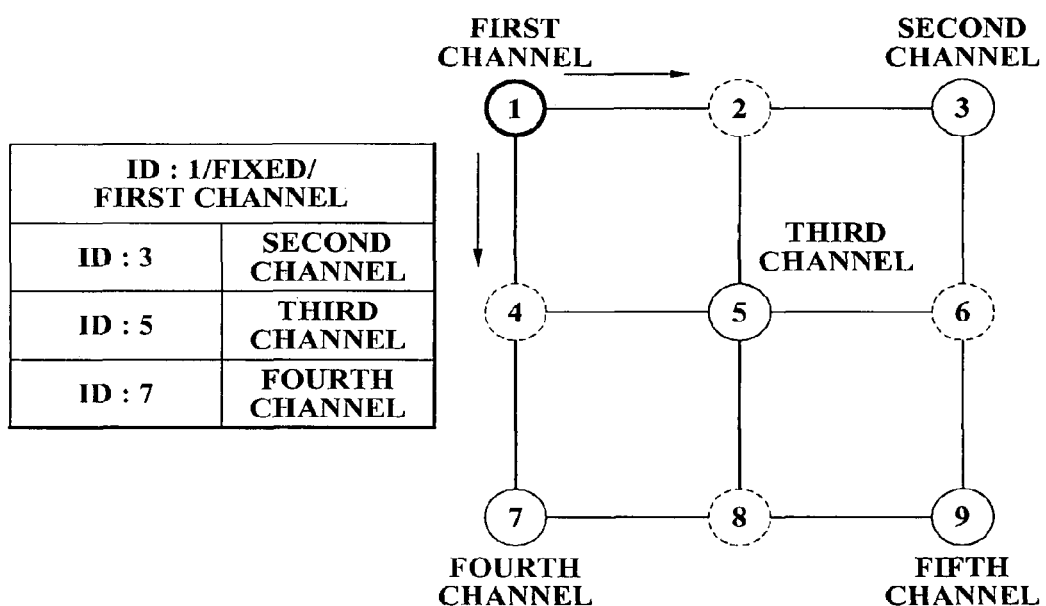
FIG. 10 is an example a first diagram illustrating a generation of a HELLO message.

FIG. 10 is an example of a first diagram illustrating a generation of a HELLO message.

As illustrated in FIG. 10, the message generation unit 410 of FIG. 4 may generate a HELLO message including an ID, a communication device type, an allocated channel, and IDs of fixed communication devices within a range of two hops and allocated channels when the communication device type is a fixed communication device.

When communication devices 1, 3, 5, 7, and 9 are fixed communication devices, and when communication devices 2, 4, 6, and 8 are switching communication devices, the communication device 1 may generate the HELLO message including own ID 1, a fixed communication device, the first channel, and an ID 3 of the fixed communication devices within a range of two hops and the allocated second channel, an ID 5 and the allocated third channel, and an ID 7 and the allocated fourth channel.

Figure 11:
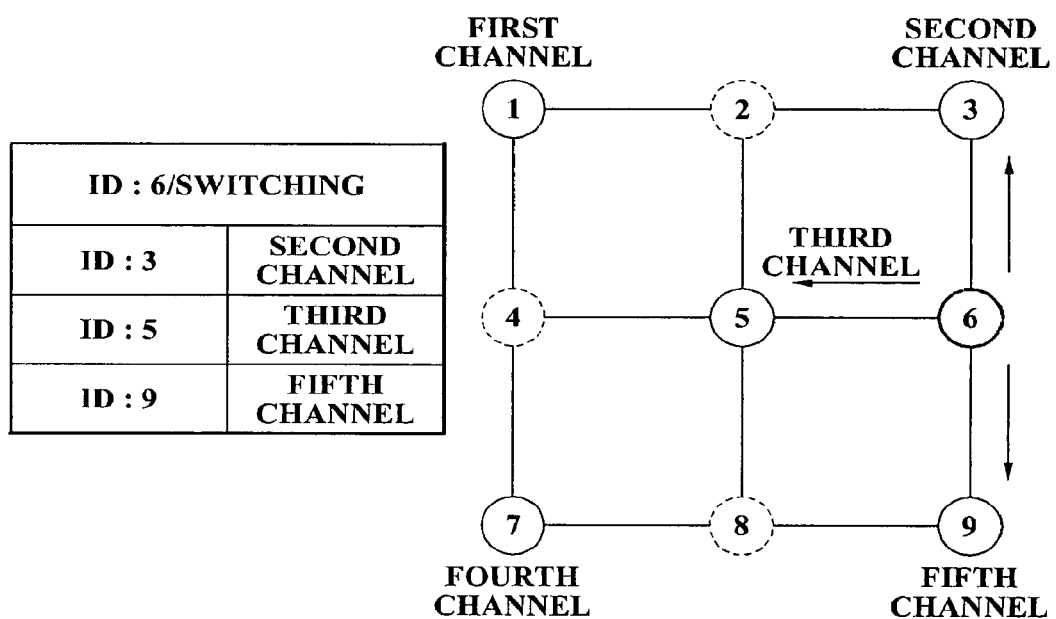
FIG. 11 is an example a second diagram illustrating a generation of the HELLO message.

FIG. 11 is an example of a second diagram illustrating the generation of the HELLO message.

As illustrated in FIG. 11, the message generation unit 410 of FIG. 4 may generate a HELLO message including an ID, a communication device type, and IDs of neighboring communication devices within a range of a single hop and allocated channels when the communication device type is a switching communication device.

When communication devices 1, 3, 5, 7, and 9 are fixed communication devices, and when communication devices 2, 4, 6, and 8 are switching communication devices, the communication device 6 may generate the HELLO message including the communication device 6's own ID 6, information that the communication device 6 is a switching communication device, and the ID's of the fixed communication devices within range of a single hop and their allocated channels, i.e. an ID 3 and the allocated second channel, an ID 5 and the allocated third channel, and an ID 9 and the allocated fifth channel.

Also, the above-described communication devices in the wireless mesh network may broadcast a data packet.

A fixed communication device overhears channels of neighboring communication devices to broadcast the data packet. The fixed communication device may transmit the data packet to a switching communication device whose channel is switched to a channel of the fixed communication device when channels of the neighboring switching communication devices are switched to the channel of the fixed communication device.

The switching communication device may switch its channel to a channel of neighboring fixed communication devices, and transmit a data packet to the channels of the neighboring fixed communication devices to broadcast the data packet.

One general aspect of the broadcasting of the data packet may provide that the switching communication device may switch a plurality of channels according to a Round-Robin manner. The switching communication device may determine a switching time, and switch the plurality of channels after transmitting/receiving the data packet within a range of a maximum time $T_{max}$. Also, the switching communication device may switch the plurality of channels after at least the maximum time $T_{max}$ passes.

The channel allocation method according to the above-described general aspects may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described general aspects.

According to general aspects, it is possible to effectively enhance an efficiency of a network using multi-channels by classifying communication devices having a single interface into a fixed communication device and a switching communication device according to a communication device type, and by allocating a channel according to the classified communication device type.

While general aspects are has shown and described, it will be understood by those skilled in the art that various changes in form and details may be made therein without departing from the spirit and scope thereof as defined by the appended claims and their equivalents.

What is claimed is:

1. A channel allocation method, comprising:
   determining a communication device type from a plurality of communication device types based on information received from neighboring communication devices, the plurality of communication device types including a fixed communication device fixed on a single channel and a switching communication device capable of switching channels, the communication device type being determined as the fixed communication device when a fixed communication device does not exist among the neighboring communication devices;
   allocating a channel according to the communication device type; and
   transmitting the communication device type and information about the allocated channel to the neighboring communication devices.

2. The channel allocation method of claim 1, wherein, in the fixed communication device, wireless connectivity is guaranteed with another fixed communication device where a common channel is allocated, or with a switching communication device where a common channel is allocated.

3. The channel allocation method of claim 1, wherein the switching communication device transmits a message to the neighboring communication devices when the channels are switched, the message informing the neighboring communication devices that the channels are switched.

4. The channel allocation method of claim 1, wherein the transmitting of the information about the determined communication device type to the neighboring communication devices comprises:
   generating a HELLO message including the determined communication device type and the allocated channel; and
   transmitting the generated HELLO message to the neighboring communication devices.

5. The channel allocation method of claim 4, wherein the generating of the HELLO message comprises:
   generating the HELLO message which includes an ID, a communication device type, an allocated channel, and IDs of the fixed communication devices within a range of two hops and allocated channels when the communication device type corresponds to a fixed communication device.

6. The channel allocation method of claim 4, wherein the generating of the HELLO message comprises:
   generating the HELLO message including an ID, a communication device type, an allocated channel, and IDs of fixed communication devices within a range of a single hop and allocated channels when the communication device type corresponds to the switching communication device.

7. A non-transitory computer-readable medium encoded with instructions that controls a type determination unit, a channel allocation unit, and a transmitting/receiving unit, the medium comprising:
   a first set of instructions that controls the type determination unit to determine a communication device type from a plurality of communication device types based on information received from neighboring communication devices, the communication device type being determined as a fixed communication device when a fixed communication device does not exist among the neighboring communication devices;
   a second set of instructions that controls the channel allocation unit to allocate a channel according to the communication device type; and
   a third set of instructions that controls the transmitting/receiving unit to transmit the communication device type and information about the allocated channel to the neighboring communication devices,
   wherein at least one of the first, second, and third set of instructions is executed by a processor.

8. A communication device, comprising:
   a type determination unit that determines a communication device type from a plurality of communication device types based on information received from neighboring communication devices, the plurality of communication devices comprising:
      a fixed communication device fixed on a single channel, the type determination unit further determining the communication device type to be the fixed communication device when a fixed communication device does not exist among the neighboring communication devices; and
      a switching communication device capable of switching channels among a plurality of channels;
   a channel allocation unit that allocates a channel according to the determined communication device type; and
   a transmitting/receiving unit that transmits information about the determined communication device type and the allocated channel to the neighboring communication devices.

9. The communication device of claim 8, wherein, in the fixed communication device, wireless connectivity is guaranteed with another fixed communication device where a common channel is allocated, or with a switching communication devices where a common channel is allocated.

10. The communication device of claim 8, wherein the switching communication device transmits a message to the neighboring communication devices when the channels are switched, the message informing the neighboring communication devices that the channels are switched.

11. The communication device of claim 8, further comprising:
    a message generation unit that generates a HELLO message including the determined communication device type and the allocated channel and transmits the generated HELLO message to the neighboring communication devices.

12. The communication device of claim 11, wherein the message generation unit generates the HELLO message which includes an ID, a communication device type, an allocated channel, and an ID of the fixed communication devices within a range of two hops, and an allocated channel when the communication device type corresponds to a fixed communication device.

13. The communication device of claim 11, wherein the message generation unit generates the HELLO message including an ID, a communication device type, an allocated channel, and an ID of the fixed communication devices within a range of a single hop and an allocated channel when communication device type corresponds to a switching communication device.

* * * * *